Figure 1:
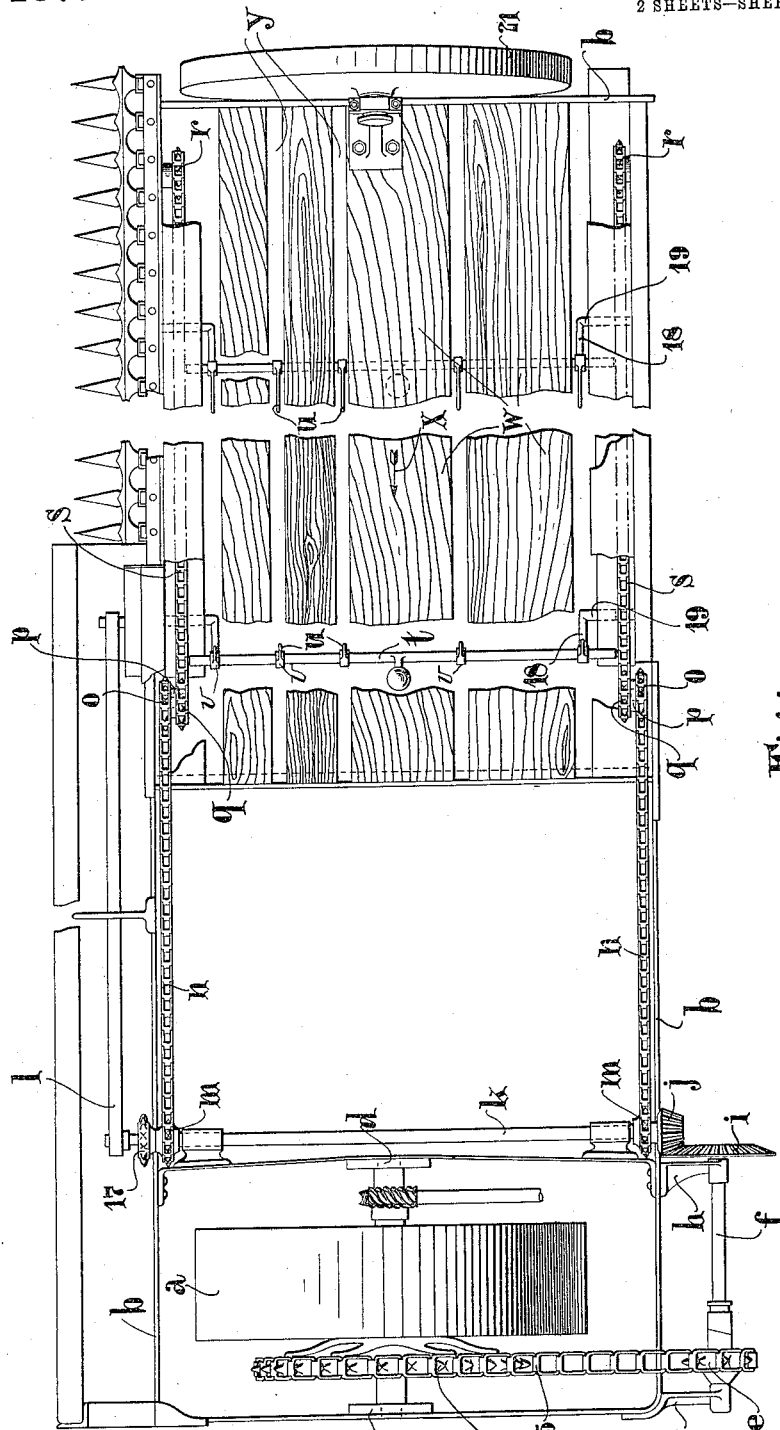

N. P. DJUNKOFSKY.
HARVESTING MACHINE.
APPLICATION FILED OCT. 2, 1909.

1,036,467.

Patented Aug. 20, 1912.
2 SHEETS—SHEET 1.

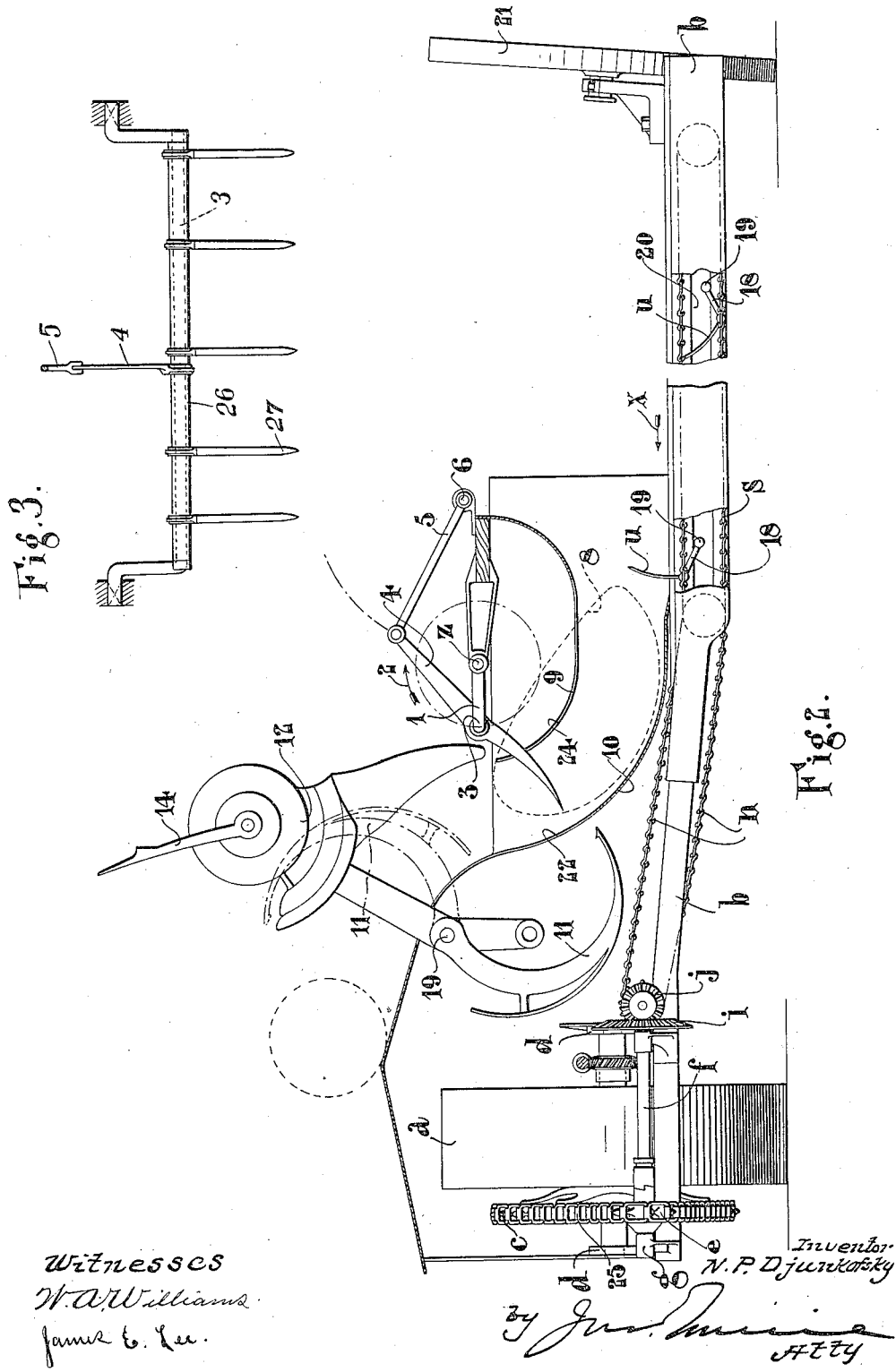

UNITED STATES PATENT OFFICE.

NIKOLAI P. DJUNKOFSKY, OF KHARKOV, RUSSIA.

HARVESTING-MACHINE.

1,036,467.  Specification of Letters Patent.  Patented Aug. 20, 1912.

Application filed October 2, 1909. Serial No. 520,698.

*To all whom it may concern:*

Be it known that I, NIKOLAI P. DJUNKOFSKY, a subject of the Czar of Russia, and residing at Kharkov, Empire of Russia, have invented certain new and useful Improvements in Harvesting - Machines, of which the following is a specification.

This invention relates to harvesting machines of the type in which corn or other crops are first cut by reaper blades suitably placed upon the machine and operated through the medium of gearing the corn being then delivered onto a platform from which it is conveyed to a binding needle which gathers a quantity of corn to form a truss which is delivered to binding mechanism from which it is ejected onto the ground.

The object of the present invention is to improve the construction of such harvesting machines so as to dispense with certain expensive parts heretofore used while improving the efficiency of the machine.

The invention consists in the improved machine hereinafter more fully described.

The accompanying drawings illustrate one form of the improved harvester.

Figure 1 is a plan view of the improved harvester with parts removed. Fig. 2 is a rear elevation with parts broken away. Fig. 3 is a detail hereinafter described.

In carrying out the invention according to one mode the main frame $b$, is supported on the ground at one end by the wheel, 21, and at its opposite end by the driving wheel $a$. Motion is communicated from the driving wheel, $a$ formed integral with the sprocket wheel $c$, and secured in bearings $d$, on the main frame $b$, to the sprocket wheel $e$, through the medium of the chain 25, said wheel $e$, being mounted at one end of a horizontal shaft $f$, supported in brackets, $g$, $h$, secured to the main frame, $b$. The other end of the shaft, $f$, carries a bevel gear $i$, rigidly secured thereto and gearing with the bevel gear $j$, fixed to the transverse shaft $k$, supported in bearings on the framing. To the other extremity of the transverse shaft, $k$, is secured the pitman $l$, for reciprocating the reaper blades in the well known manner.

Mechanism for operating the conveyer will now be described.

On the transverse shaft $k$, and toward opposite ends thereof are rigidly secured two sprocket wheels, $m$, $m$. Gearing with the sprocket wheels $m$, $m$, through the intermediary of the chains, $n$, $n$, are the sprocket wheels, $o$, $o$, mounted on intermediate shafts, $p$ $p$. Sprocket wheels $q$ $q$, also secured to the shafts $p$ $p$, gear with sprocket wheels, $r$ $r$, through the intermediary of the chains, $s$ $s$, which latter form part of the conveying means. Pivoted to the chains, $s$ $s$, and at right angles thereto are two or more transverse shafts, $t$ $t$, moving longitudinally under the conveyer platform, $w$, in the direction of the arrow, $x$, (Fig. 2) and carrying a number of feeding arms, $u$, fixed to sleeves, $v$, secured to the shafts, $t$ $t$, in any convenient manner. As the shafts $t$ $t$, move toward the binding mechanism 12, the feeding arms, $u$, protruding vertically through slots, $y$, in the conveyer platform $w$, grasp the previously cut corn or the like projected thereon and feed it along the platform of the elevator toward the binding mechanism. As the feeding arms $u$, pass to their lowermost positions they are prevented from projecting vertically downward by arms 18, secured to their retaining shafts, $t$ $t$, and carrying at their ends rods or bars, 19, adapted to move in guideways, 20, formed in the frame of the machine. By this means the feeding arms $u$, take up inclined positions as shown in Fig. 2, thus affording protection from any damage which might otherwise occur through encountering obstructions during the operation of the machine.

From the foregoing description it will be evident that as each shaft, carrying its respective feeding arms $u$, moves along the conveyer platform, a quantity of previously cut corn or other crops projected thereon is fed along the same in trusses in an intermittent manner to mechanism hereinafter described and from thence to the binding mechanism.

Mechanism for delivering the corn or the like to the binding mechanism will now be described with reference to Figs. 2 and 3.

Mounted on the shaft $z$, is a crank or cranks 1, moved in the direction of the arrow 2. Rotatably mounted on the crank pin 3 is a sleeve 26 to which are secured a number of fingers 27. Secured to the sleeve 26 is a link 4 pivoted to a link 5 mounted on the rock shaft, 6. On rotation of the crank 1, the upper end of the link 4, will move in the arc of a circle described by the link 5, while the lower ends of the fingers 27 will move in the path of the curved dotted line 8, (see Fig. 2) thus imparting a rocking action to them. The corn fed in an intermittent manner along the conveyer is grasped by the fingers 27, and elevated between the shield 9, and the apron 10, and presented to the binding needle 11, the shield 9, being provided with recesses 24, to allow the passage of the fingers 27 therethrough. The apron 10, is also provided with a slot 22, to allow the binding needle to pass therethrough.

As shown in Fig. 2, the fingers 27 are about to reciprocate to gather the corn or the like collected by the arms $u$ and feed it to binding needle 11 of the well known binding mechanism 12, to be bound into sheaves. The binding needle is of curved formation and is mounted on the shaft 19, secured to the frame of the machine, motion being imparted to it through suitable gearing from the sprocket wheel 17, on the transverse shaft $k$.

After a truss of corn or the like is bound into a sheaf in the manner hereinbefore described it is thrown from the binder by the discharge arm 14, onto the sheaf carrier, or onto the inclined rods, along which it can roll onto the ground.

Having now described my invention what I claim as new and desire to secure by Letters Patent is:—

In a harvesting machine, comprising means for reaping the corn, binding mechanism and a conveyer for the reaped corn, means for intermittently feeding the corn in trusses from the conveyer to the binding mechanism comprising a crank, a sleeve rotatably mounted on the crank pin thereof, a plurality of fingers secured to said sleeve, a rock shaft, a link mounted on said rock shaft, an arm pivoted to the free end of said link, and rigidly connected at its other end to the sleeve.

In testimony whereof, I have signed my name to this specification in the presence of two subscribing witnesses.

N. P. DJUNKOFSKY.

Witnesses:
  H. A. LOVIAGUINE,
  A. M. AGLITZKY.

---

Copies of this patent may be obtained for five cents each, by addressing the "Commissioner of Patents, Washington, D. C."